(12) United States Patent
Takizawa (10) Patent No.: US 8,487,495 B2
(45) Date of Patent: Jul. 16, 2013

(54) ROTOR FOR MOTOR

(75) Inventor: Daijiro Takizawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 90 days.

(21) Appl. No.: 13/239,929

(22) Filed: Sep. 22, 2011

(65) Prior Publication Data

US 2012/0074805 A1    Mar. 29, 2012

(30) Foreign Application Priority Data

Sep. 28, 2010 (JP) .................... 2010-216299

(51) Int. Cl.
*H02K 21/12* (2006.01)

(52) U.S. Cl.
USPC ............. 310/156.53; 310/156.01; 310/156.54

(58) Field of Classification Search
CPC .............................. H02K 1/276; H02K 1/2766
USPC ........................... 310/156.53–156.57, 156.83
IPC ............. H02K 1/27, 21/14, 21/16, 21/18, 21/20
See application file for complete search history.

(56) References Cited

U.S. PATENT DOCUMENTS

| | | | | |
|---|---|---|---|---|
| 6,940,199 | B2 * | 9/2005 | Imamura et al. | ......... 310/156.48 |
| 7,705,503 | B2 | 4/2010 | Takahashi et al. | |
| 7,791,236 | B2 * | 9/2010 | Liang et al. | ............... 310/156.07 |

FOREIGN PATENT DOCUMENTS

| | | | |
|---|---|---|---|
| JP | 2004-242494 | | 8/2004 |
| JP | 2007-104888 | A | 4/2007 |
| JP | 2008086130 | A * | 4/2008 |
| JP | 2010246330 | A * | 10/2010 |

OTHER PUBLICATIONS

Machine Translation, JP 2008086130 A, Apr. 10, 2008.*
Machine Translation, JP 2010246330 A, Oct. 28, 2010.*
Japanese Office Action for corresponding JP Application No. 2010-216299, Dec. 28, 2011.
Japanese Office Action for corresponding JP Application No. 2010-216299, Mar. 26, 2012.

* cited by examiner

*Primary Examiner* — Tran Nguyen
*Assistant Examiner* — Thomas Truong
(74) *Attorney, Agent, or Firm* — Ditthavong Mori & Steiner, P.C.

(57) ABSTRACT

A rotor includes a hub, a rotor core, holes and permanent magnets. Salient poles are each formed between neighboring openings on a circumference of the rotor core and, when viewed from a front along a line of axis of the rotor, a recessed portion that is formed by causing one portion of an inner circumferential surface of the rotor core to bulge radially outward of another portion is provided in a region enclosed by a first virtual line connecting a center of the hub and a circumferential middle position on the circumference of a magnetic pole of the rotor core having permanent magnets provided therein and a second virtual line connecting the center of the hub and a circumferential middle position on the circumference of the salient pole adjacent to the magnetic pole at a leading side in a rotational direction of the rotor.

10 Claims, 8 Drawing Sheets

*Prior Art*

ROTOR FOR MOTOR

CROSS-REFERENCE TO RELATED APPLICATIONS

The present application claims priority under 35 U.S.C. §119 to Japanese Patent Application No. 2010-216299, filed Sep. 28, 2010, entitled "Rotor". The contents of this application are incorporated herein by reference in their entirety.

BACKGROUND OF THE INVENTION

1. Field of the Invention

The present invention relates to a rotor.

2. Discussion of the Background

Rotors for permanent-magnet motors that have been lightened to reduce their weight are well known (for example, Japanese Patent No. 3954018).

Figure 8:
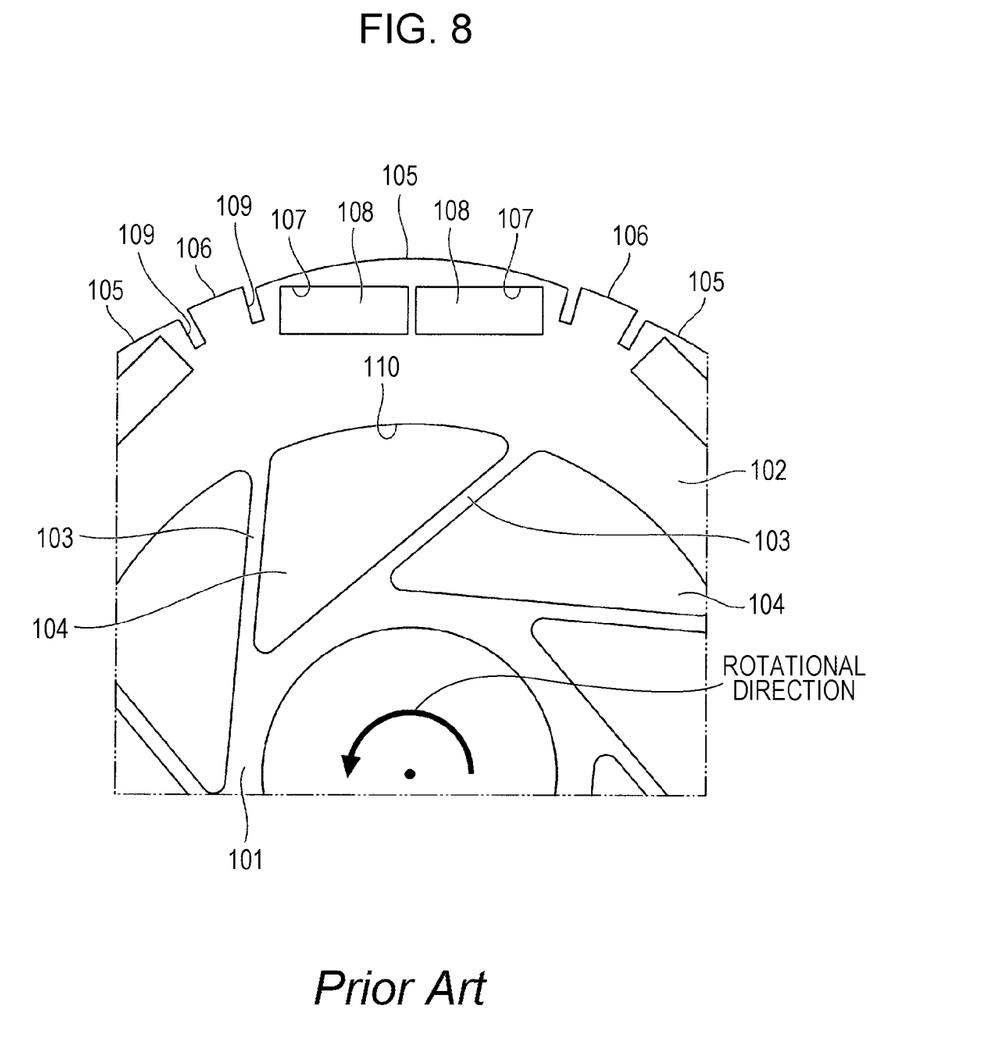
FIG. 8 is a front view of part of a conventional rotor.

A conventional rotor that has been lightened is briefly described below with reference to FIG. 8. A rotor 100 includes a cylindrically shaped hub 101 secured to an output shaft, an annularly-shaped rotor core 102 disposed radially outward of the hub 101, and a plurality of ribs 103 that connect the hub 101 and the rotor core 102, all of which are integrally formed into one piece where a section between the hub 101 and the rotor core 102 is provided with a plurality of holes 104. Such holes 104 are known as lightening holes. Magnetic poles 105 and salient poles 106 are alternately disposed on the circumference of the rotor core 102 along the circumferential direction, and permanent magnets 108 are fitted in and secured to openings 107 formed in the magnetic poles 105.

Grooves 109 extending radially inward from the circumference of the core 102 are each formed between the magnetic poles 105 and the salient poles 106 that neighbor each other. In other words, the salient pole 106 is provided between a pair of the grooves 109. The holes 104 have the same shape, and a wall surface (namely, inner circumferential surface 110 of the rotor core) disposed radially outward of the hole 104 is formed in an arc-like surface along a circle concentric with the hub 101 and the rotor core 102.

SUMMARY OF THE INVENTION

According to one aspect of the present invention, a rotor includes a cylindrically shaped hub, an annularly shaped rotor core, holes and permanent magnets. The hub is secured to an output shaft. The rotor core is disposed radially outward of the hub and connected to the hub with a plurality of ribs therebetween so as to be formed integrally with the hub. The holes are formed between the hub and the rotor core so as to be provided among the ribs. The permanent magnets are retained in openings that are formed on a circumference of the rotor core so as to be substantially equally spaced apart from one another in a circumferential direction. Salient poles are each formed between neighboring openings among the openings on the circumference of the rotor core and, when viewed from a front along a line of axis of the rotor, a recessed portion that is formed by causing one portion of an inner circumferential surface of the rotor core to bulge radially outward of another portion is provided in a region enclosed by a first virtual line connecting a center of the hub and a circumferential middle position on the circumference of a magnetic pole of the rotor core having the permanent magnets provided therein and a second virtual line connecting the center of the hub and a circumferential middle position on the circumference of the salient pole adjacent to the magnetic pole at a leading side in a rotational direction of the rotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

An embodiment of the present invention provides a rotor (for example, a rotor 1 according to an embodiment to be described later) which includes a cylindrically-shaped hub (for example, a hub 5 according to an embodiment to be described later) that is secured to an output shaft, an annularly-shaped rotor core (for example, a rotor core 6 according to an embodiment to be described later) that is disposed radially outward of the hub and is connected to the hub with a plurality of ribs (for example, ribs 7 according to an embodiment to be described later) therebetween so as to be formed integrally with the hub, holes formed between the hub and the rotor core so as to be provided among the ribs (for example, holes 8 according to an embodiment to be described later), and permanent magnets (for example, permanent magnets 3, 3A, 3B according to an embodiment to be described later) retained in openings (for example, openings 11, 11A, 11B according to an embodiment to be described later) that are formed on a circumference of the rotor core so as to be substantially equally spaced apart from one another in a circumferential direction, wherein each of salient poles (for example, salient poles 10 according to an embodiment to be described later) is formed between the neighboring openings provided on the circumference of the rotor core and, when viewed from the front along the line of axis of the rotor, a recessed portion (for example, recessed portions 36 according to an embodiment to be described later) that is formed by causing one portion of an inner circumferential surface of the rotor core to bulge radially outward of the other portion (for example, main section 35 according to an embodiment to be described later) is provided in a region enclosed by a first virtual line (for example, a first virtual line S1 according to an embodiment to be described later) connecting a center of the hub and a circumferential middle position on the circumference of the magnetic pole of the rotor core having the permanent magnets therein and a second virtual line (for example, second virtual line S2 according to an embodiment to be described later) connecting the center of the hub and a circumferential middle position on the circumference of the salient pole adjacent to the magnetic pole at the leading side in the rotational direction of the rotor. With this configuration, weight reduction of the rotor can be achieved without any drop in torque.

In the rotor according to the embodiment, the recessed portion may have a wall surface formed of a curved surface that bulges radially outward of the rotor and one end of the wall surface is directly connected to a wall surface constituting the rib. This arrangement may alleviate stress concentration at the radially outward edge of the rib when the rotor is rotated. Also, this arrangement may simplify the shape of the rotor, resulting in an improved yield ratio and cost reduction.

In the rotor according to the embodiment, the recessed portion may be located in a region enclosed by the first virtual line and the second virtual line so as to be formed in a portion where a level of magnetic flux that passes through the rotor core is low when the rotor produces a maximum output. With this arrangement, the weight reduction of the rotor can be attained without any drop in maximum output.

The embodiments will now be described with reference to the accompanying drawings, wherein like reference numerals designate corresponding or identical elements throughout the various drawings.

An embodiment according to the present invention is described below with reference to FIGS. 1 through 7. The rotor according to this embodiment is a rotor to be installed in an automotive motor unit.

Figure 1:
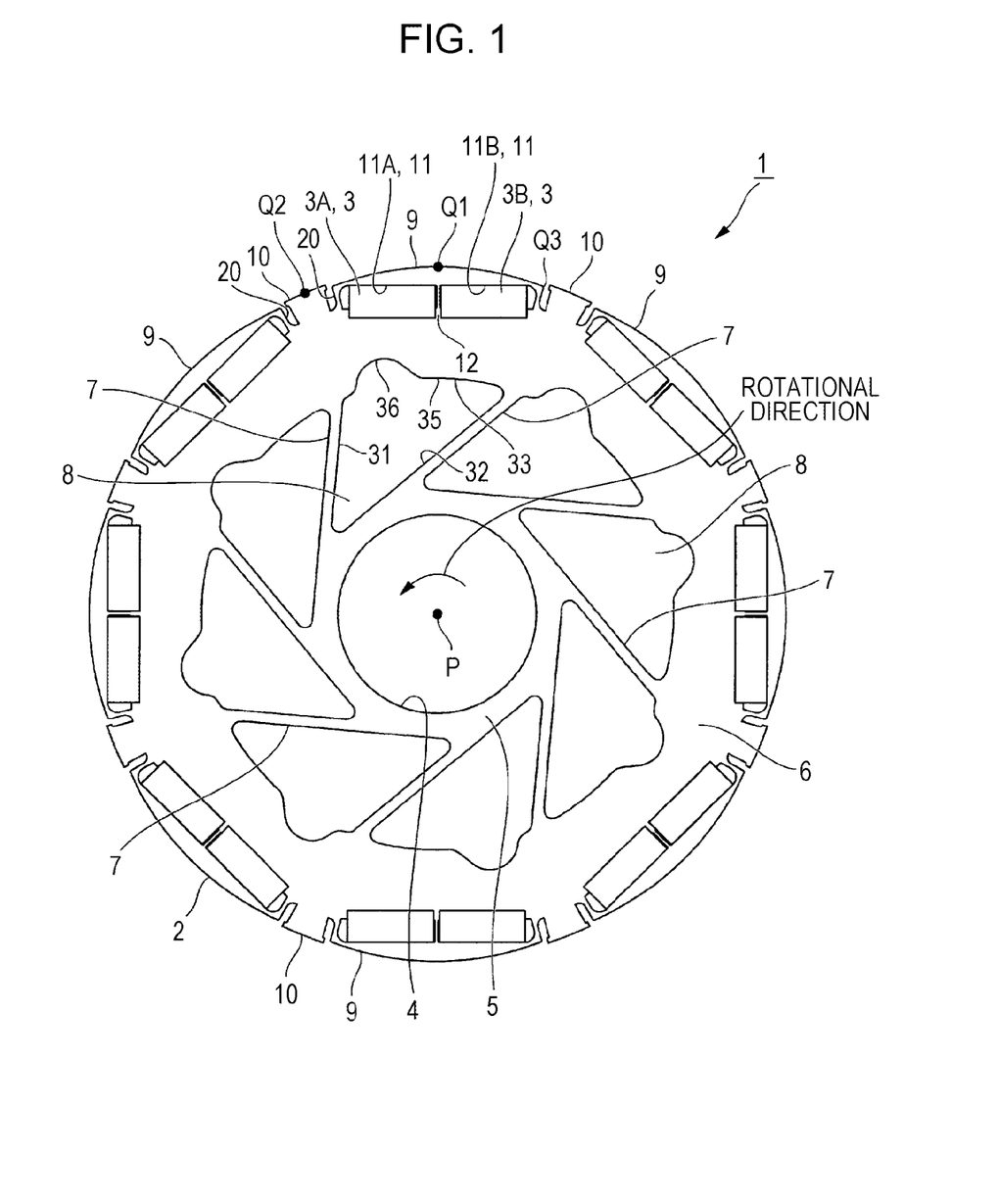
FIG. 1 is a front view of a rotor according to an embodiment of the present invention.
Figure 2:
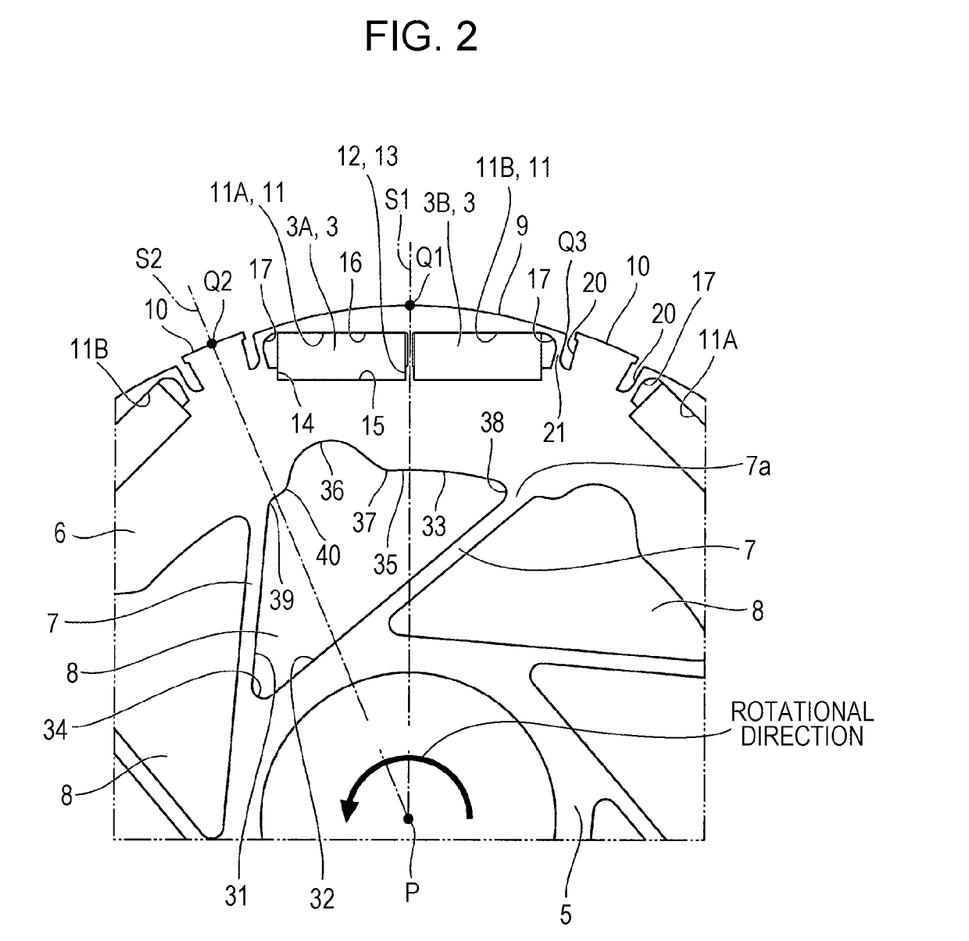
FIG. 2 is an enlarged front view showing a main section of a rotor according to an embodiment.

FIG. 1 shows a front view of a rotor according to this embodiment, as seen from an axial direction. FIG. 2 is an enlarged view of part of FIG. 1.

A rotor 1 includes a core 2 integrally formed by swaging a plurality of laminated magnetic steel plates having a substantially circular shape, when viewed from the front, and a plurality of permanent magnets 3 held in the vicinity of the circumference of the core 2. Unless otherwise defined, the term "radial direction" used throughout the following description refers to a radial direction of the core 2.

The core 2 includes a cylindrically shaped hub 5 having a circular hole 4 for securing an output shaft formed in the center thereof, an annularly shaped rotor core 6 disposed radially outward of the hub 5, and a plurality of ribs 7 that connect the hub 5 and the rotor core 6, all of which are integrally formed into one piece where a section between the hub 5 and the rotor core 6 is divided into a plurality of holes 8 that are partitioned by the ribs 7. The hub 5 is fixed to an output shaft (not illuminated).

Eight magnetic poles 9 are provided on the circumference of the rotor core 6 so as to be circumferentially equally spaced from one another (namely, at 45 degree intervals), and salient poles 10 are provided between the adjacent magnetic poles 9, 9. In a circumferential surface of each of the magnetic poles 9, a radial distance from a center P of the hub 5 is the largest at a circumferential middle position Q1 and becomes smaller toward a circumferential end and is the smallest at a circumferential end Q3.

The magnetic pole 9 has an opening 11 for holding the permanent magnets 3 formed therein. The opening 11 is separated by a radially formed rib 12 into an opening 11A formed on a leading side (left-hand side of FIGS. 1 and 2) in the rotational direction of the rotor 1 and an opening 11B formed on a trailing side (right-hand side of FIGS. 1 and 2) in the rotational direction of the rotor 1. The rib 12 is located in the magnetic pole 9 in a circumferential middle position. The permanent magnet 3 is also separated into two permanent magnets 3A, 3B having the same magnetic property. The permanent magnet 3A is mounted in the opening 11A, while the permanent magnet 3B is mounted in the opening 11B. The permanent magnets 3A, 3B are formed in a thin parallelepiped shape and have the same shape and size.

The openings 11A, 11B are bilaterally symmetric with the rib 12 therebetween. The opening 11A formed on the leading side in the rotational direction of the rotor 1 is described below, and description of the opening 11B is omitted.

The opening 11A has four wall portions 13, 14, 15, 16 for holding sides of the permanent magnet 3A. The first wall portion 13 corresponding to the outer surface of the rib 12 and the second wall portion 14 opposed to the first wall portion 13 are formed so as to linearly extend substantially along the radial direction, and the third wall portion 15 and the fourth wall portion 16 that are disposed in parallel to each other so as to be located inwardly and outwardly, respectively, linearly extend so as to be perpendicular to the first wall portion 13 and the second wall portion 14. A flux barrier 17 is formed between the second wall portion 14 and the fourth wall portion 16 so as to bulge toward the adjacent salient pole 10.

Each of grooves 20 extending radially inward from the circumference of the rotor core 6 is formed between the magnetic pole 9 and the salient poles 10 of the rotor core 6. In other words, the salient pole 10 is formed between a pair of the grooves 20, 20 that are formed so as to be circumferentially spaced apart from each other between the adjacent openings 11, 11. A rib 21 is formed between the groove 20 and the flux barrier 17 of the opening 11. The groove 20 has substantially the same circumferential width except its deepest portion (namely, radially innermost portion), and the deepest portion is curbed farther away from the rib 21 as its circumferential width becomes smaller.

A total of eight holes 8 are formed between the hub 5 and the rotor core 6, which correspond to the magnetic poles 9, respectively. The rib 7 formed between the adjacent holes 8, 8 extends linearly so as to intersect at about 45 degrees with a first virtual line S1 connecting the circumferential middle position Q1 on the circumference of the magnetic pole 9 and the center P of the hub 5. In addition, the flux barrier 17 of the opening 11A is located on an extended line radially extending outward of the rib 7. Furthermore, a radially outer end 7a of the rib 7 is approximately located on a virtual line connecting the center P of the hub 5 and the circumferential end Q3 of the magnetic pole 9 which is at the trailing side in the rotational direction of the rotor 1.

The hole 8 is defined by a first wall surface 31 corresponding to one side of the rib 7, a second wall surface 32 corresponding to the other side of the rib 7 and the outer surface of the hub 5, and a third wall surface 33 corresponding to the inner circumferential surface of the rotor core 6 in such a manner that the third wall surface 33 is opposed to the opening 11 of the magnetic pole 9.

The first wall surface 31 and the second wall surface 32 are linear and smoothly connected to each other through an arc portion 34 located radially inward.

The third wall surface 33 includes an arc-like main section 35 centering on the center P of the hub 5 and a substantially semi-circular recessed portion 36 that is formed on the leading side in the rotational direction of the rotor 1 as compared to the main section 35 and bulges radially outward, in which the main section 35 and the recessed portion 36 are smoothly connected through an arc portion 37 that bulges radially inward. In other words, the recessed portion 36 is formed in such a manner that part of the inner circumferential surface of the rotor core 6 bulges more radially outward than the main section 35.

The second wall surface 32 and the main section 35 of the third wall surface 33 are smoothly connected through an arc portion 38 that radially bulges outward. The first wall surface 31 and the recessed portion 36 of the third wall surface 33 are smoothly connected through an arc portion 39 that radially bulges outward and an arc portion 40 that is continuous from the arc portion 39 and radially bulges inward.

As described above, the wall surfaces of the hole 8 are smoothly connected through the arc portions, thereby alleviating stress concentration at the inner surface of the hole 8 when the rotor 1 is rotated.

The recessed portion 36 is disposed within a region enclosed by the first virtual line S1 connecting the circumferential middle position Q1 on the circumference of the magnetic pole 9 and the center P of the hub 5 and a second virtual line S2 connecting a circumferential middle position Q2 on the circumference of the salient pole 10 adjacent to the magnetic pole 9 at the leading side in the rotational direction of the rotor 1 and the center P of the hub 5.

A comparison of the core 1 according to this embodiment with a core (hereinafter referred to as "core for comparison") of the same shape and size as the core 1 except that the main section 35 extends to the first wall surface 31 in the hole 8 with the recessed portion 36 not provided in the third wall surface 33 indicates that the core 1 according to this embodiment is lighter than the core for comparison because the recessed portion 36 is provided in the hole 8.

Next, the location of the recessed portion 36 in the hole 8 is discussed.

Figure 4:
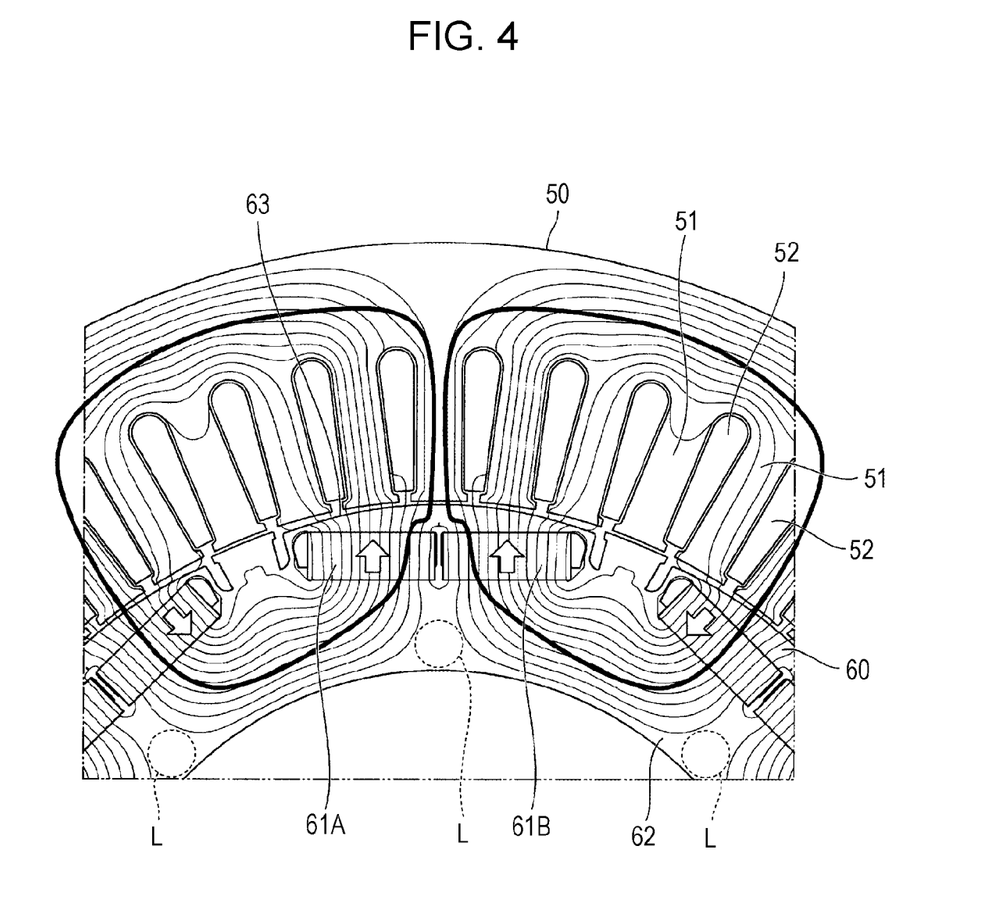
FIG. 4 is a diagram showing magnetic flux of a rotor having no recessed portion at the time of no current application.
Figure 5:
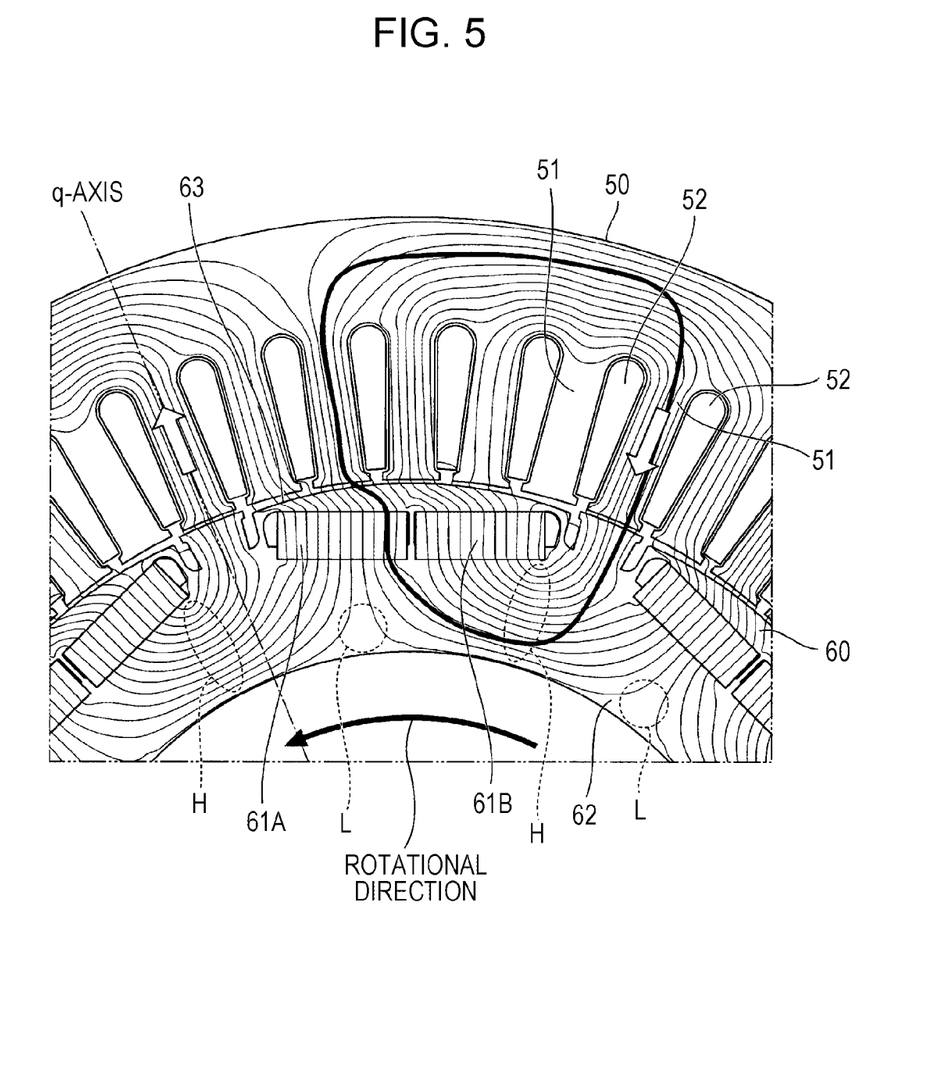
FIG. 5 is a diagram showing magnetic flux of a rotor having no recessed portion at low load levels.
Figure 6:
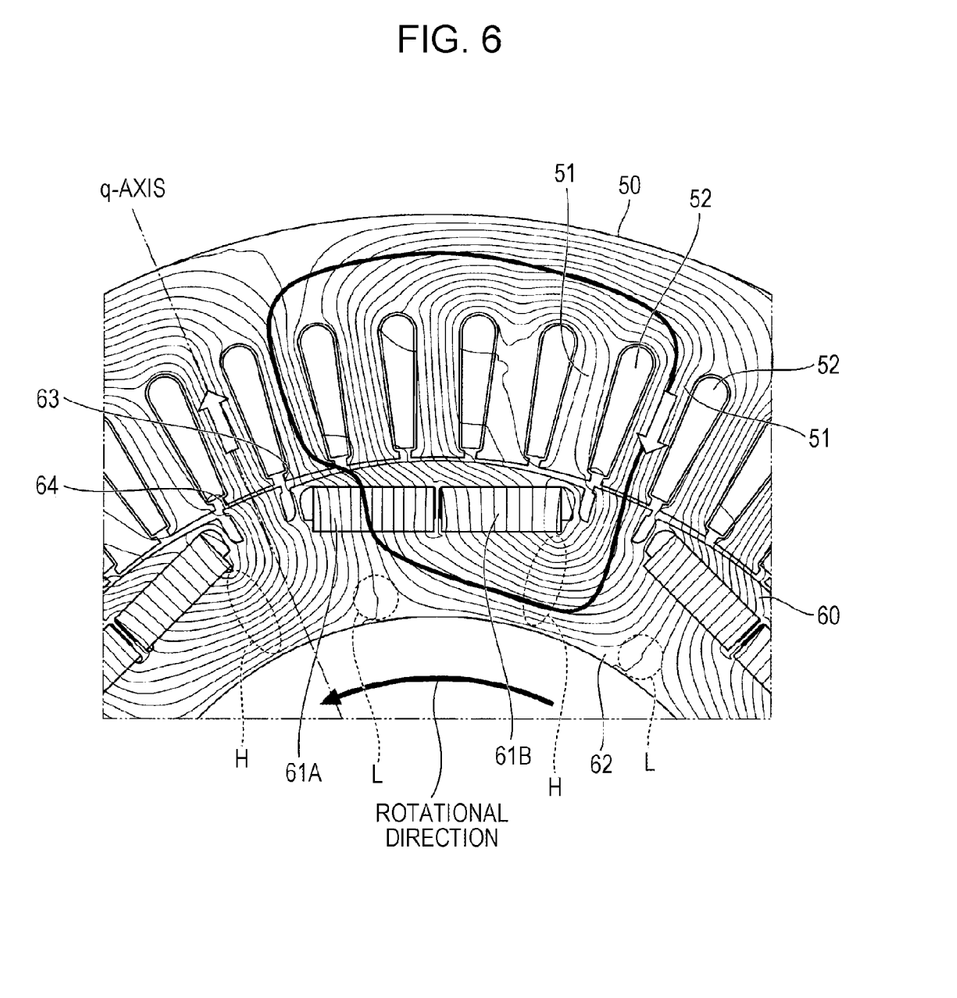
FIG. 6 is a diagram showing magnetic flux of a rotor having no recessed portion at high load levels.

FIGS. 4 to 6 show an analysis of magnetic flux loop when a rotor having no recessed portion 36, like the core for comparison, is mounted on a stator, in which thin lines indicate magnetic flux. In those figures, reference numeral 50 denotes a stator, in which a coil 52 is wound around a number of teeth 51. The rotor 60 is disposed inside of the stator 50 and is rotated in a counterclockwise direction as viewed in the figures when a rotating magnetic field is generated as a result of application of current to the coil 52. In the description that follows, a section located radially inward of the permanent magnets 61A, 61B is referred to as a back yoke section in the rotor core 62 of the rotor 60.

FIG. 4 shows magnetic flux when no current is applied. In this case, there is only magnetic flux generated by the permanent magnets 61A, 61B of the rotor 60, which is indicated by bold lines in FIG. 4. At this time, the rotor core 62 of the rotor 60 has an extremely low flux density portion L (hereinafter referred to as low flux density portion) occurring on an inner circumferential side thereof at a position corresponding to the circumferential middle position of the magnetic pole 63.

FIG. 5 shows magnetic flux when a current corresponding to low load levels is passed through the coil 52. In this case, magnetic flux arising from q-axis current (torque generating current) is added to the magnetic flux by the permanent magnets 61, resulting in the magnetic flux loop indicated by bold lines of FIG. 5. In the back yoke section of the rotor core 62, part of the magnetic flux of the permanent magnet 61A located on the leading side in the rotational direction passes through the same portion as a portion through which the magnetic flux of the permanent magnet 61B located on the trailing side in the rotational direction passes, which results in higher magnetic flux density (hereinafter referred to as high flux density portion H) in the back yoke section of the permanent magnet 61B located on the trailing side in the rotational direction, causing the low flux density portion L to move to the leading side in the rotational direction.

FIG. 6 shows magnetic flux when a current corresponding to high load levels is passed through the coil 52. In this case, q-axis current produces a higher level of magnetic flux, causing the low flux density portion L to further move to the leading side in the rotational direction. However, even if a current corresponding to a maximum load level is passed through the coil 52, the low flux density portion L does not move to the leading side in the rotational direction beyond a virtual line connecting the center of the rotor 60 and the circumferential middle position on the outer circumference of a salient pole 64 adjacent to the magnetic pole 63 on the leading side in the rotational direction of the rotor 60.

As described above, the low flux density portion L that is hardly used as a flux path occurs in the inner circumferential side of the rotor core 62. Accordingly, if a radial length of the rotor core 6 is configured in such a manner that there is no magnetic flux saturation in the high flux density portion H, weight reduction of the rotor can be achieved without any drop in torque even if portions corresponding to the low flux density portion L are cut off.

In the rotor 1 according to the embodiment described above, the recessed portion 36 is located in the hole 8 on the basis of this concept. Consequently, the main section 35 of the third wall surface 33 in the hole 8 is configured to have an inner diameter that does not cause magnetic flux saturation in the rotor core 6 at portions radially inward of the main section 35.

Although the recessed portion 36 is disposed within a region enclosed by the first virtual line S1 connecting the circumferential middle position Q1 on the circumference of the magnetic pole 9 and the center P of the hub 5 and a second virtual line S2 connecting a circumferential middle position Q2 on the circumference of the salient pole 10 adjacent to the magnetic pole 9 at the leading side in the rotational direction of the rotor 1 and the center P of the hub 5, preferably the recessed portion 36 is formed in a portion which becomes the low flux density portion L when the rotor 1 produces a maximum output. This arrangement can achieve a weight reduction of the rotor 1 without any drop in the maximum output.

Figure 3:
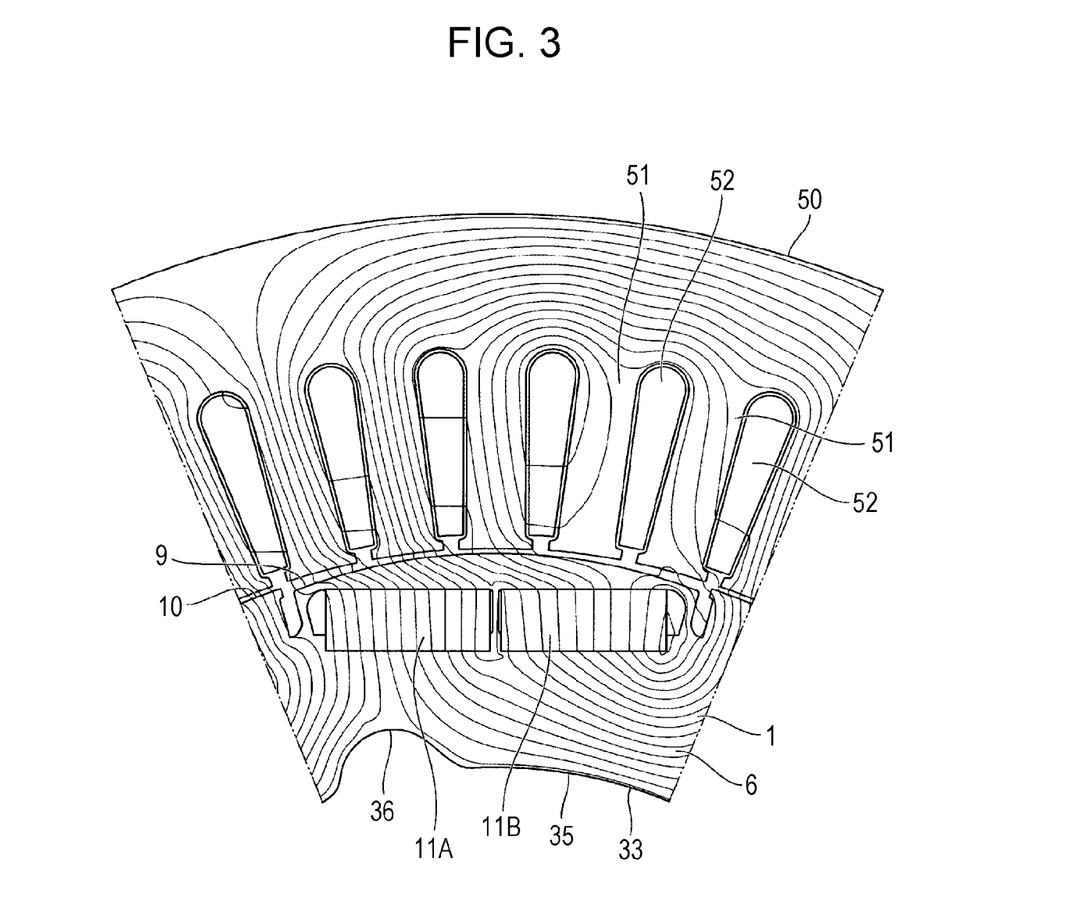
FIG. 3 is a diagram showing magnetic flux of a rotor according to an embodiment at a maximum torque.

FIG. 3 shows magnetic flux lines for the rotor 1 having the recessed portion 36 formed at a portion that becomes the low flux density portion L at the time of the maximum output, indicating that magnetic flux passes in such a manner as to avoid the recessed portion 36 at the time of the maximum output.

An experiment proves that the recessed portion 36 formed in the hole 8 as described above does not adversely affect medium load torque, magnetic characteristics, and mechanical strength and magnet scattering strength of the core 2 associated with the maximum torque load.

Figure 7:
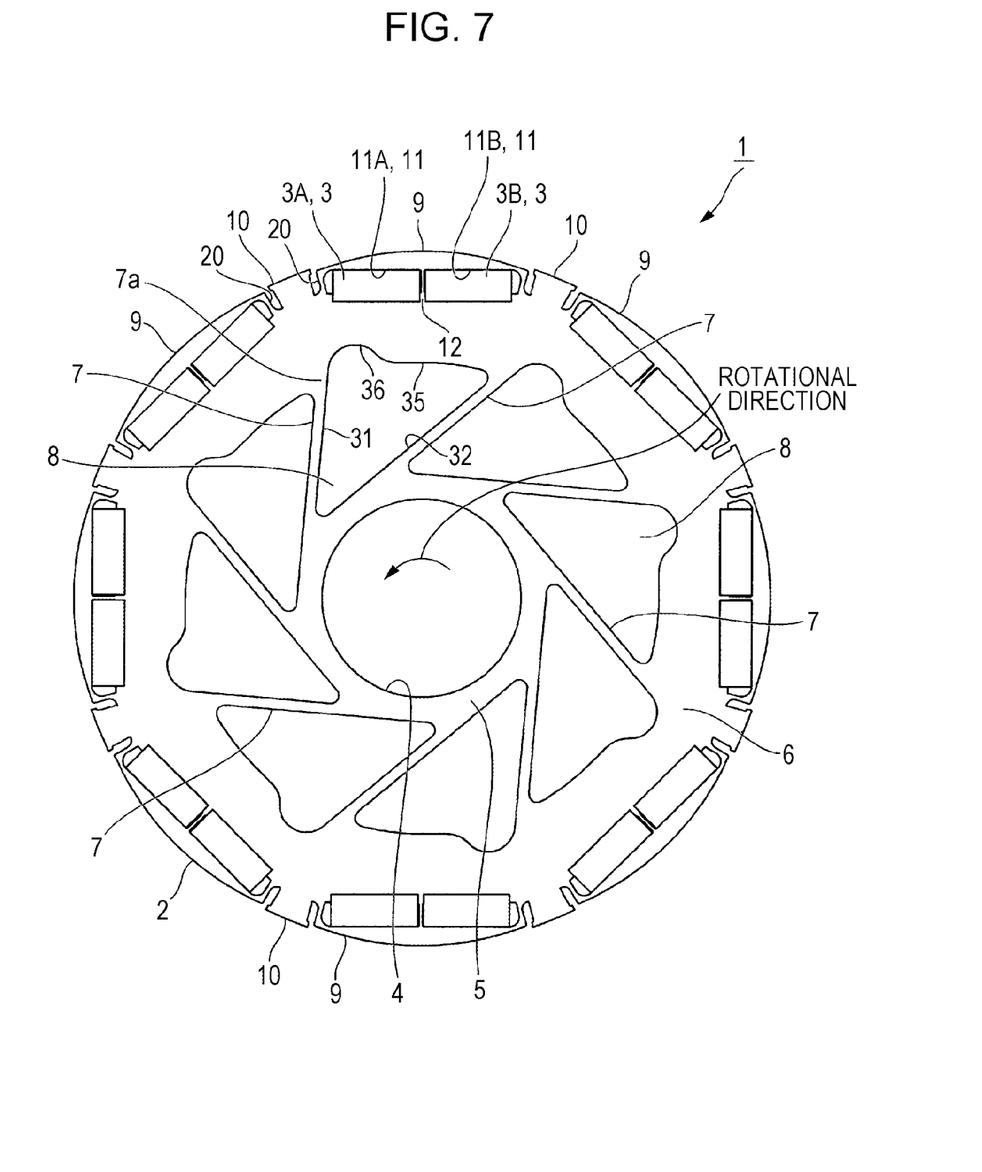
FIG. 7 is a front view of a rotor according to another embodiment of the present invention.

FIG. 7 shows a front view of a rotor 1 according to another embodiment. A difference from the rotor 1 described above is a shape of the hole 8. Only such a difference is described below, and the reference numerals and symbols in FIG. 7 refer to the same components as those with the same reference numerals and symbols described above, and repeated descriptions of the same components are omitted.

In the rotor 1 according to this embodiment, a front edge (an end of the wall surface) of the recessed portion 36 (wall surface consisting of a curved surface that bulges radially outward of the rotor 1) of the third wall surface 33 is directly connected to a radially outward edge of the first wall surface 31 (wall surface constituting the rib 7) in the hole 8 in such a manner that the first wall surface 31 is disposed on a tangent line drawn on the recessed portion 36 at such an edge. In other words, in the embodiment described above, there are no arc portions 39, 40 for connecting the recessed portion 36 and the first wall surface 31.

This arrangement alleviates stress concentration at the radially outward edge 7a of the rib 7 when the rotor 1 is rotated. Also, this arrangement simplifies the shape of the core 2, resulting in an improved yield ratio and cost reduction.

Other Embodiment

The embodiment of the present invention is typically described with reference to, but the present invention is not limited to, the foregoing preferred embodiments.

For example, the shape of the hole 8 and the recessed portion 36 is not limited to the shape according to the embodiment. Also, the number of the magnetic poles 9 and the salient poles 10 is not limited to eight.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor comprising:
   a cylindrically shaped hub secured to an output shaft;
   an annularly shaped rotor core disposed radially outward of the hub and connected to the hub with a plurality of ribs therebetween so as to be formed integrally with the hub, the rotor core including openings substantially equally spaced apart from one another in a circumferential direction of the rotor;
   holes formed between the hub and the rotor core so as to be provided among the ribs, each of the holes including an arc-shaped surface and a recessed portion, the arc-shaped surface centering on a center of the hub and corresponding to an inner circumferential surface of the rotor core, the recessed portion bulging more outward than the arc-shaped surface in a radial direction of the rotor; and
   permanent magnets retained in the openings,
   wherein salient poles are each formed between the openings in the circumferential direction of the rotor and provided on an outer circumference of the rotor core, and
   wherein, when viewed from a front along a line of axis of the rotor, a radially outermost part of the recessed portion is provided in a region enclosed by a first virtual line and a second virtual line, the first virtual line connecting the center of the hub and a circumferential middle position on an outer circumference of a magnetic pole of the rotor core having the permanent magnets provided therein, a the second virtual line connecting the center of the hub and a circumferential middle position on an outer circumference of the salient pole adjacent to the magnetic pole at a leading side in a rotational direction of the rotor.

2. The rotor according to claim 1, wherein the recessed portion includes a wall surface having a curved surface bulging more outward than the arc-shaped surface in the radial direction of the rotor.

3. The rotor according to claim 2, wherein one end of the wall surface of the recessed portion is directly connected to a wall surface constituting the rib.

4. The rotor according to claim 1, wherein the recessed portion is located in the region enclosed by the first virtual line and the second virtual line.

5. The rotor according to claim 1, wherein the second virtual line is disposed closer to the recessed portion than the first virtual line in the circumferential direction.

6. The rotor according to claim 1,
   wherein each of the holes includes a first arc portion connecting the recessed portion to the arc-shaped surface, and
   wherein, when viewed from the front along the line of the axis of the rotor, the first arc portion is provided in the region closed by the first virtual line and the second virtual line.

7. The rotor according to claim 6, wherein the first arc portion inward bulges in the radial direction of the rotor and smoothly connects the recessed portion to the arc-shaped surface.

8. The rotor according to claim 6,
   wherein each of the holes includes
      a second arc portion provided at an end of a wall surface of the each of the ribs, and
      a third arc portion connecting the recessed portion to the second arc portion, and
   wherein, when viewed from the front along the line of the axis of the rotor, the third arc portion is provided in the region closed by the first virtual line and the second virtual line.

9. The rotor according to claim 8,
   wherein the second arc portion outward bulges in the radial direction of the rotor, and
   wherein the third arc portion inward bulges in the radial direction of the rotor and smoothly connects the recessed portion to the second arc portion.

10. The rotor according to claim 1,
    wherein the rotor core includes intermediate ribs provided in the openings,
    wherein each of the openings includes a first opening and a second opening separated from one another by each of the intermediate ribs, and
    wherein each of the permanent magnets includes a first permanent magnet and a second permanent magnet, the first permanent magnet being retained in the first opening, the second permanent magnet being retained in the second opening.

* * * * *